Patented Mar. 7, 1933

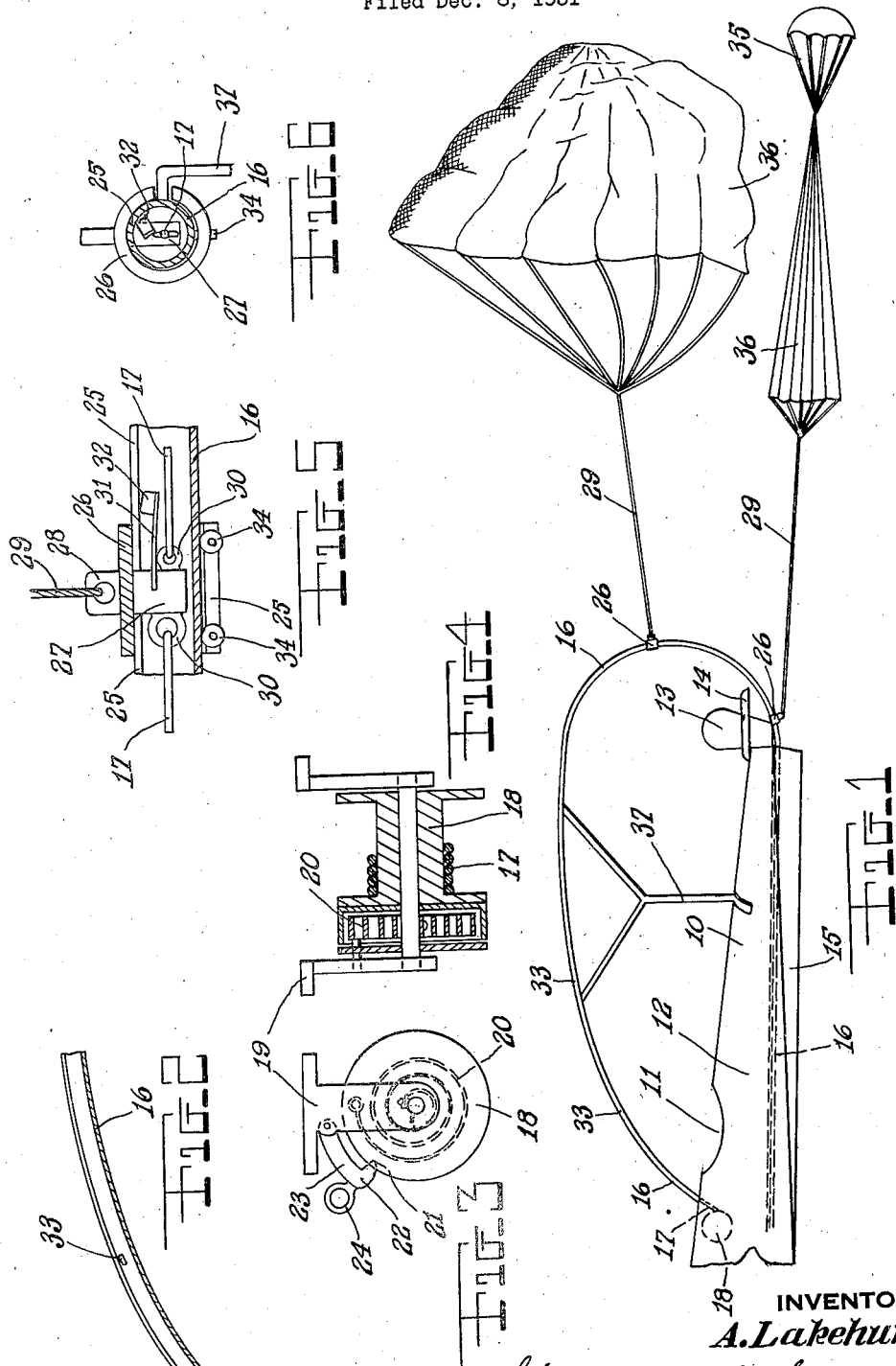

1,900,399

UNITED STATES PATENT OFFICE

ALBERT LAKEHURST, OF BROOKLYN, NEW YORK, ASSIGNOR TO LAKEWOOD COMET AERO ADVERTISING COMPANY, OF LAKEWOOD, NEW JERSEY

PARACHUTE PROJECTING DEVICE FOR AIRPLANES

Application filed December 6, 1931. Serial No. 579,699.

The main object of this invention is the provision of a novel means for releasing parachutes from airplanes for the purpose of supporting the airplane and bringing it safely to earth in case it for any reason fails in its flight.

Still another object of the invention is to provide a mechanism for releasing such parachutes from airplanes in such manner that the parachute is prevented from becoming entangled with any part of the plane.

A further object is the provision of means for releasing a plurality of parachutes from a single airplane and positioning the parachutes at spaced-apart distances from each other, thus distributing the load of the supported plane among the several parachutes.

The above and other objects will become apparent in the description below, in which characters of reference refer to like-named parts in the drawing.

Referring briefly to the drawing, Fig. 1 is a partial side elevational view of an airplane illustrating the mechanism for guiding the parachutes into active position.

Fig. 2 is a cross-sectional view of a section of the guide member.

Fig. 3 is a side view of the cable winding drum.

Fig. 4 is a longitudinal cross-sectional view of the cable winding drum.

Fig. 5 is a cross-sectional view of a section of the guide member, showing the means by which the parachute is connected therewith and to the winding cable.

Fig. 6 is an end view of Fig. 5.

Referring in detail to the drawing, the number 10 indicates the body of an airplane whose cockpit is shown at 11 and whose center of gravity is approximately at the position indicated at 12. The rudder is shown at 13, and the elevator at 14. A cylinder or pipe 15 of sufficiently large diameter to house a collapsed parachute, extends outward from and along the lower edge of the body 10, the outer surface of the body being curved in stream-line fashion to meet the surface of the pipe lying outside of the body.

A hollow guide 16 pipe-like in form, and of smaller diameter than the pipe 15, is secured at one end by suitable means, not shown, in the forward end of the pipe 15. This guide 16 extends rearward out of the pipe 15, curves around the elevator 14 and rudder 13, then curves upward, forward, and downward, being secured at its forward upper end to the body of the plane adjacent the cockpit 11 by suitable means, not shown. A cable 17 lies in the pipe or guide 16, the end of the cable lying in the forward end of the pipe 15 being free and unattached when the device is ready for use. This cable 17 extends all the way through the guide 16, and the end passing out of the latter at the upper forward end of the latter, is wound on a drum 18. The latter is supported rotatably on brackets 19, and is provided with a coiled spring 20 tending to normally wind the cable onto the drum. A notch 21 is provided in the periphery of the drum, normally engaged by a tongue 22 projecting from a pawl 23 pivotally attached to the bracket 19. A handle 24 is provided on the pawl 23.

A slot 25 is provided in the guide 16, extending lengthwise through the length of the guide. For each parachute, a sleeve 26 surrounds the guide 16, and a tongue 27 projects from this sleeve into the guide through the slot 25. A tongue 28 also extends outward from the sleeve 26, and is provided with an opening in which the cord 29 of the parachute is secured. The sleeve 26 is adapted to slide on the guide 16 with the tongue 27 acting as a guide for the sleeve. The cable 17 is broken at each parachute, and the ends are attached to the sides of the tongue 27 by means of rings 30 on the tongue. A resilient finger 31, secured at one end to the tongue 27 in any suitable manner, extends outward therefrom, and at its free end is provided with an off-set lug 32. At predetermined points in the length of the guide 16, from which it is desired that the parachutes be suspended when in action, slots 33 are provided adjacent the slot 25. The forwardmost of these slots 33 is the largest, and the size of the slot diminishes for each successive rearward slot. Likewise, the off-set lug 32 for the parachute which is to be suspended from the forwardmost position, is the largest, to slip into, and be locked into, the forwardmost slot 33, and the lugs 32 on successively rearward sleeves, for successively rearward parachutes, are successively smaller.

In the lower wall (Fig. 5) of the sleeve 26, slots are provided in which rollers 34 are mounted, so that this wall will roll along the guide 16, this being the wall which will be forced against the guide while the sleeve is moving along the guide.

In use, when the pilot believes the plane unsafe for further flight, he releases the tongue 22 from slot 21 in the drum 18, whereupon the spring 20 will cause the cable 17 to wind on the drum. The parachutes meanwhile have been stored in folded condition, inside the pipe 15. The cable will then pull the parachutes, one after the other, out of the pipe 15, and as they get clear of the pipe they will open. A pilot parachute 35 may be provided to assist in the opening of the parachutes 36. The advancing cable will draw the sleeves 26 along the guide 16. The lug 32 of the first parachute to emerge from the pipe 15, being of greater dimensions than any of the slots 33 excepting the forwardmost, will slide over all the others, but on reaching the forwardmost, will be forced by the resilient finger 31 into said slot, thus stopping the sleeve 26 at that point, and from that point that parachute will suspend the plane. Likewise, the remaining parachutes will find their proper positions on the guide 16, and the plane will then be suspended by all of the parachutes. It is to be noted that the curvature of the guide 16 around the rudder and elevator serves to guide the parachutes past these parts to prevent entangling of the parachutes with the same.

Obviously modifications in the form and structure may be made without departing from the spirit and scope of the invention. A Y-shaped support 37 is mounted on the body 10 to support the guide 16, the upper ends of the arms thereof passing through a slot in the side of the sleeve 26 when the latter is passing said arms.

I claim:

1. In combination with an airplane and a parachute, means for storing the parachute comprising a tube extending lengthwise of the plane, said tube being open at the rear end of the plane, a tubular guide secured within said tube and extending outward, upward, and forward above the plane, the forward end of said guide being secured to the plane adjacent the cockpit, a cable passing through said guide, a winding drum having said cable wound thereon, a sleeve surrounding said guide and having the parachute secured thereto, said cable upon being wound on said drum withdrawing the parachute from said tube along said guide.

2. In combination with an airplane and a parachute, means for storing the parachute comprising a tube extending lengthwise of the plane, said tube being open at the rear end of the plane, a tubular guide secured within said tube and extending in a vertical plane to a point adjacent the cockpit of the plane, the forward end of said guide being secured to the plane, a cable passing through said guide, a drum having one end of said cable wound thereon, said guide having a slot extending lengthwise therein, a sleeve surrounding said guide and having a tongue engaging said slot, the parachute being secured to said sleeve, said cable upon being wound on said drum withdrawing the parachute from said tube along said guide.

3. In combination with an airplane and a parachute, means for storing the parachute comprising a tube extending lengthwise of the plane, said tube being open at the rear end of the plane, a tubular guide secured within said tube and extending in a vertical plane around the tail of the plane to a point forward of the center of gravity of the plane, the forward end of said guide being secured to the plane, a cable passing through said guide, a drum having one end of said cable wound thereon, said guide having a slot extending lengthwise therein, a sleeve surrounding said guide and having a tongue engaging said slot, the parachute being secured to said sleeve, said cable upon being wound on said drum withdrawing the parachute from said tube along said guide, said guide having a second slot therein wider than the first and of shorter length, and resilient means on said tongue engaging said second slot and locking said sleeve in position when said sleeve reaches the position of said second slot in passing along the guide.

In testimony whereof I affix my signature.

ALBERT LAKEHURST.